(12) United States Patent
Matsui et al.

(10) Patent No.: US 7,669,500 B2
(45) Date of Patent: Mar. 2, 2010

(54) ENERGY ABSORBING STEERING APPARATUS

(75) Inventors: Isao Matsui, Nara (JP); Yota Uesaka, Toyohashi (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 37 days.

(21) Appl. No.: 12/076,536

(22) Filed: Mar. 19, 2008

(65) Prior Publication Data
US 2008/0236326 A1 Oct. 2, 2008

(30) Foreign Application Priority Data
Mar. 30, 2007 (JP) ............................. 2007-093953

(51) Int. Cl.
*B62D 1/18* (2006.01)
(52) U.S. Cl. ..................... 74/493; 280/775; 280/777
(58) Field of Classification Search .................. 74/492, 74/493; 280/775, 777
See application file for complete search history.

(56) References Cited

U.S. PATENT DOCUMENTS

| 7,367,589 B2 * | 5/2008 | Stuedemann et al. ........ 280/777 |
|---|---|---|
| 2004/0232685 A1 * | 11/2004 | Gatti et al. ................... 280/777 |
| 2006/0049620 A1 * | 3/2006 | Lee ............................. 280/777 |
| 2007/0013183 A1 * | 1/2007 | Jensen et al. ................. 280/777 |
| 2008/0111363 A1 * | 5/2008 | Menjak et al. .............. 280/777 |
| 2008/0238070 A1 * | 10/2008 | Bodtker ...................... 280/777 |
| 2008/0238071 A1 * | 10/2008 | Oh ............................. 280/777 |
| 2009/0085338 A1 * | 4/2009 | Tanaka et al. ............... 280/777 |

FOREIGN PATENT DOCUMENTS

JP 2006-96120 A 4/2006

* cited by examiner

*Primary Examiner*—David M Fenstermacher
(74) *Attorney, Agent, or Firm*—Birch, Stewart, Kolasch & Birch, LLP

(57) ABSTRACT

An energy absorbing steering apparatus S of the invention includes: a lever 48 which interconnects steering-side outer segments 46, 47 sandwiching therebetween steering-side inner fixed segments 42, 43 disposed upwardly of a steering column C thereby to be relatively moved together with fixed portions 42b, 43b of the steering-side inner fixed segments 42, 43 and to relatively move fixed portions 46b, 47b of the steering-side outer segments 46, 47 when the steering column C is moved relative to a vehicle body; and an actuator 50 disposed laterally of the steering column C and operative to release the lever 48 from the connection with the steering-side outer segment 47.

2 Claims, 8 Drawing Sheets

ENERGY ABSORBING STEERING APPARATUS

FIELD OF THE INVENTION

The present invention relates to an energy absorbing steering apparatus for use in, for example, a motor vehicle.

DESCRIPTION OF THE PRIOR ART

The vehicle steering apparatus conventionally has an energy absorbing structure. In the event of a so-called secondary collision where reaction to crash impact in an automobile collision causes a driver to collide against a steering wheel, the energy absorbing structure provides driver protection by axially retracting a steering column or disengaging the steering column from a vehicle body. Particularly, an example of the structure designed to disengage the steering column from the vehicle body is disclosed in Japanese Patent Publication No. 2006-96120. The structure is adapted to reduce an impact load on the driver colliding against the steering wheel by utilizing resistance occurring in conjunction with tearing apart a metal sheet.

As shown in FIG. 8, the prior-art energy absorbing steering apparatus designed to reduce the impact load by tearing apart the metal sheet, as described above, may include: a disengageable bracket 101 integrally fixed to an unillustrated steering column; a stationary bracket 102 fixed to the vehicle body; and an energy absorbing member 103 interposed between these brackets.

The energy absorbing member 103 includes: a first vehicle-side fixed segment 104 disposed substantially centrally of a width thereof; first and second steering-side fixed segments 107, 108 continuously connected with opposite lateral sides of the first vehicle-side fixed segment via grooves 105, 106; and second and third vehicle-side fixed segments 111, 112 continuously connected with respective outer lateral sides of these first and second steering-side fixed segments 107, 108 via grooves 109, 110.

The second and third vehicle-side fixed segments 111, 112 have their distal ends bonded/fixed to the stationary bracket 102 by soldering or the like. The first and second steering-side fixed segments 107, 108 have their distal ends fixed to the disengageable bracket 101 by soldering or the like.

The first vehicle-side fixed segment 104 is formed with a through-hole 104a at an end thereof. The stationary bracket 102 is formed with a through-hole 102a in coaxial relation with the through-hole 104a. A coupling pin 113 is inserted through these through-holes 102a, 104a so that the first vehicle-side fixed segment 104 is fixed to the stationary bracket 102 by means of the coupling pin 113.

The coupling pin 113 is free to be advanced or retracted as driven by an actuator 114 fixed to place upward of the stationary bracket 102. The first vehicle-side fixed segment 104 is so constructed as to be released from the stationary bracket 102 by retracting the coupling pin 113.

The energy absorbing steering apparatus having the above construction is adapted to reduce the impact load on the driver by way of the resistance occurring in conjunction with tearing apart the individual fixed segments when the steering column is moved relative to the vehicle body due to the secondary collision. In a case where the impact load is comparatively great, the coupling pin 113 is held in the advanced position thereby fixing the first vehicle-side fixed segment 104 to the stationary bracket 102, while the steering column is relatively moved thereby tearing apart every one of the fixed segments along every one of the grooves 105, 106, 109, 110.

In a case where the impact load is comparatively small, on the other hand, the coupling pin 113 is retracted for releasing the first vehicle-side fixed segment 104 from the stationary bracket 102. Therefore, only the grooves 109, 110 disposed between the first and second steering-side fixed segments 107, 108 and the second and third vehicle-side fixed segments 111, 112 are torn apart whereas the grooves 105, 106 remain untorn.

Specifically, this energy absorbing steering apparatus is capable of selectively operating the actuator 114 for adjusting the number of portions to be torn apart according to the magnitude of the impact load caused by the secondary collision. In short, the apparatus is capable of varying the impact load that can be reduced by the apparatus.

In the prior-art energy absorbing steering apparatus, the actuator 114 for varying the impact load that can be reduced by the apparatus is disposed at place upward of the stationary bracket 102 in order to fix the first vehicle-side fixed segment 104 disposed substantially centrally of the group of fixed segments in continuous connection. Therefore, the apparatus has a large upward expansion from place at the steering column. When mounted in the vehicle, the apparatus is apt to interfere with any other devices of the vehicle, suffering a poor layout characteristic.

OBJECT AND SUMMARY OF THE INVENTION

It is an object of the invention to provide an energy absorbing steering apparatus featuring an enhanced layout characteristic.

According to the invention, an energy absorbing steering apparatus comprises: an energy absorbing member which includes a plurality of first fixed segments comprising a metal sheet and including fixed portions fixed to one of a vehicle body and a steering column, and a plurality of second fixed segments comprising a metal sheet, including fixed portions fixed to the other one of the vehicle body and the steering columm and connected with the plural first fixed segments via grooves recessed in a sheet thickness direction, and which absorbs an impact energy by permitting the individual fixed portions of the fixed segments to be moved relative to each other for tearing apart the individual fixed segments along the grooves in conjunction with relative movement between the steering column and the vehicle body occurring upon impact; and relieving means which relieves some of the plural first fixed segments from being torn apart from the second fixed segments and which includes: a connecting member which interconnects a pair of first fixed segments of the plural first segments as connected with the respective fixed portions of the paired first fixed segments sandwiching therebetween at least one first fixed segment disposed upwardly of the steering column and which, during the relative movement between the steering column and the vehicle body, abuts against the fixed portion of the first fixed segment sandwiched between the paired first fixed segments thereby being brought into the relative movement together with the fixed portion in the abutment relation therewith as interconnecting the paired first fixed segments, and brings the fixed portions of the paired first fixed segments into the relative movement; and connection release means which is disposed laterally of the steering column and which releases the connecting member from the connection with the paired first fixed segments, thereby inhibiting the connecting member from bringing the fixed portions of the paired first fixed segments into the relative movement and preventing the paired first fixed segments from being torn apart from the second fixed segments.

According to the energy absorbing steering apparatus constituted as described above, out of the plural first fixed segments, the paired first fixed segments sandwiching at least one first fixed segment disposed upwardly of the steering column are interconnected. Therefore, the connections at which the paired first fixed segments thus interconnected are connected to the connecting member may be located laterally of at least the single first fixed segment disposed upwardly of the steering column. This permits the connection release means belonging to the relieving means to be located at place proximal to a lateral side of the steering column, so that the connection release means is prevented from protruding upwardly. It is therefore easy to prevent the energy absorbing steering apparatus from interfering with any other devices in the vehicle when the apparatus is mounted in the vehicle. Thus, the energy absorbing steering apparatus can achieve the enhanced layout characteristic.

It is preferred in the above energy absorbing steering apparatus that the connecting member and the paired first fixed segments are interconnected by pin members inserted through through-holes formed in these components, and that the connection release means comprises an actuator retractably inserting the pin member into the through-holes.

In this case, the energy absorbing steering apparatus may have a structure which can easily release the connection between the connecting member and the paired first fixed segments. In addition, the connection release may be easily controlled by means of the actuator.

DESCRIPTION OF THE PREFERRED EMBODIMENTS

Figure 1:
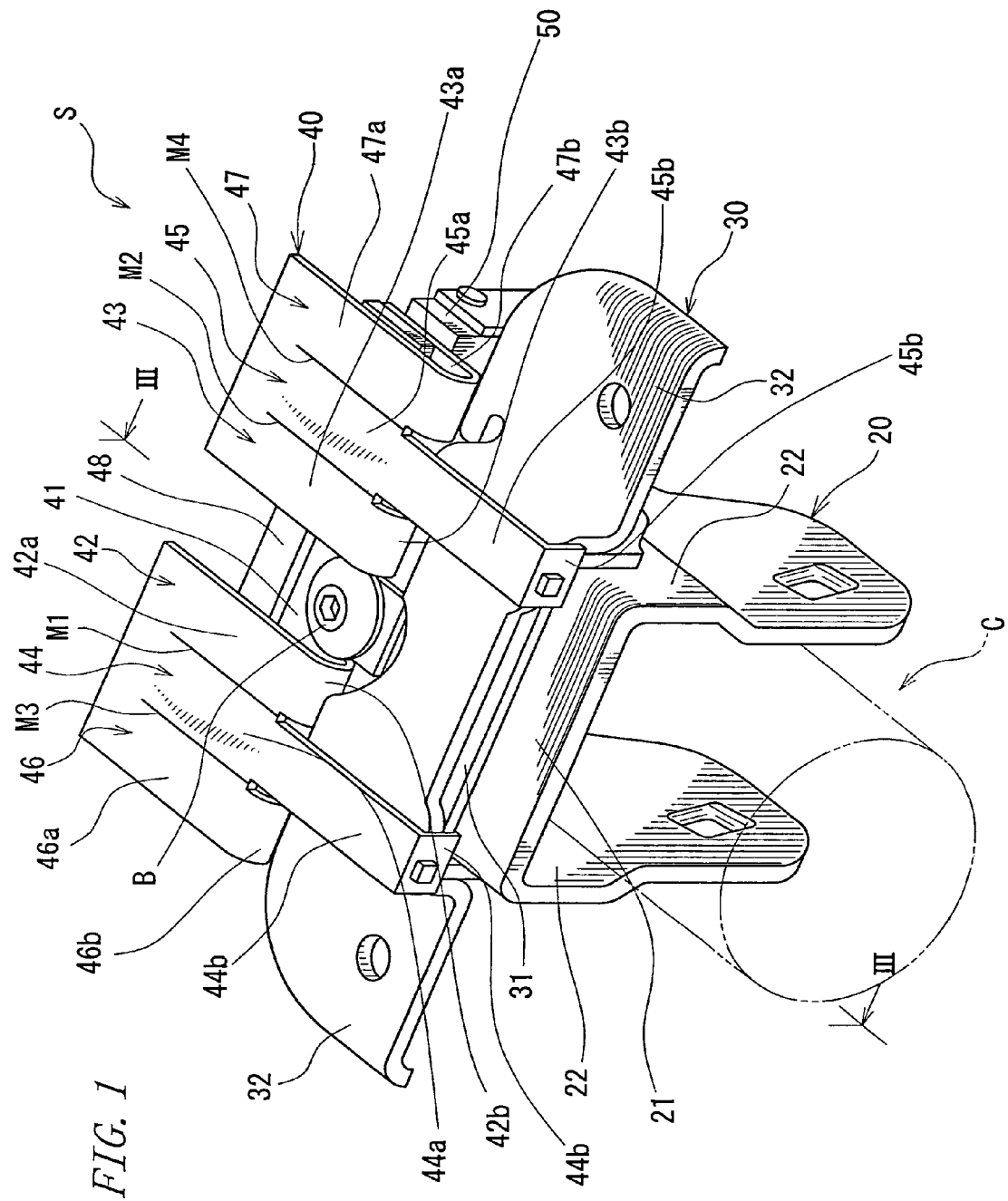
FIG. 1 is a perspective view showing a constitution of an essential part of a vehicle steering apparatus according to one embodiment of the invention.
Figure 2:
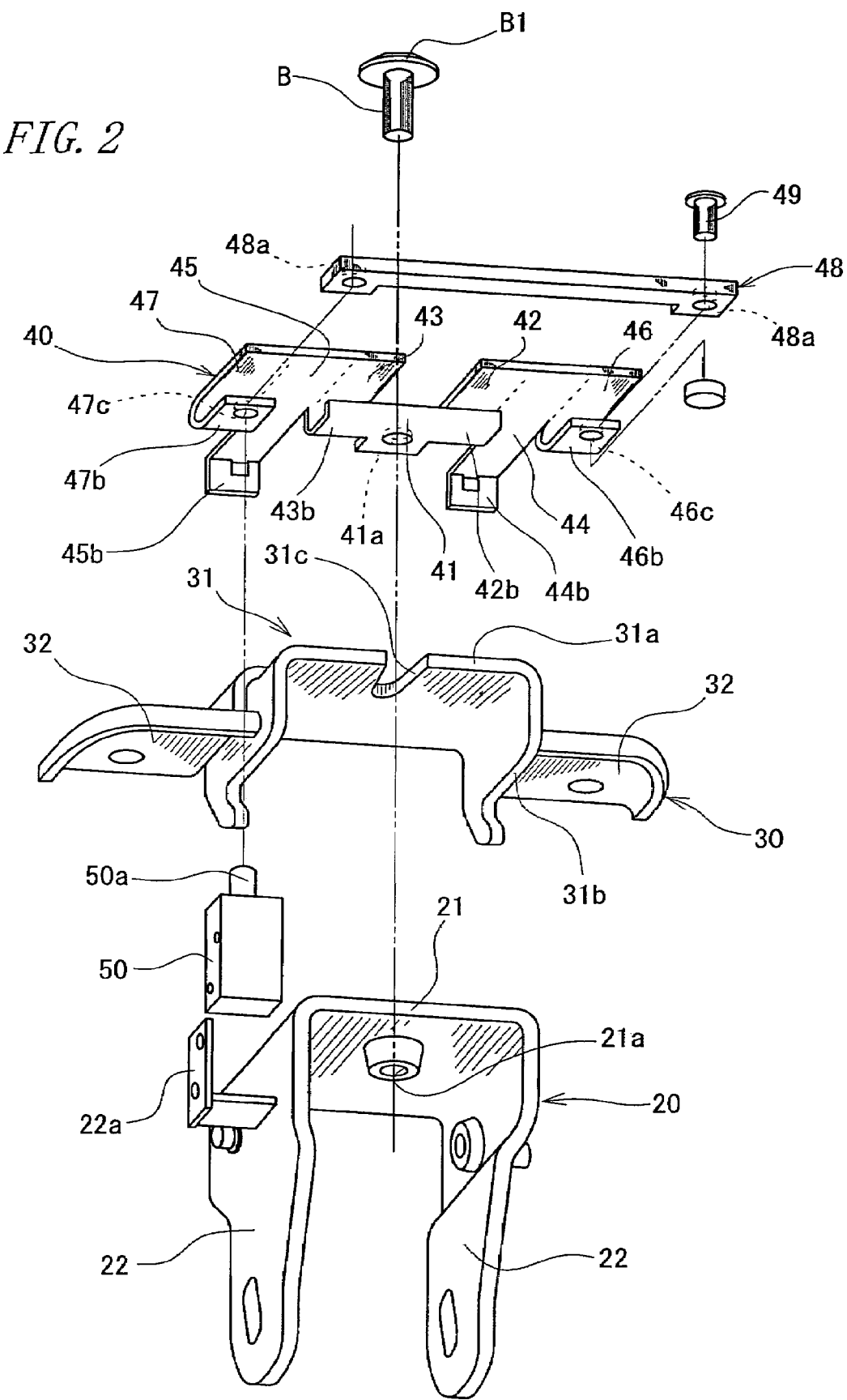
FIG. 2 is an exploded view of an energy absorbing steering apparatus according to the embodiment.
Figure 3:
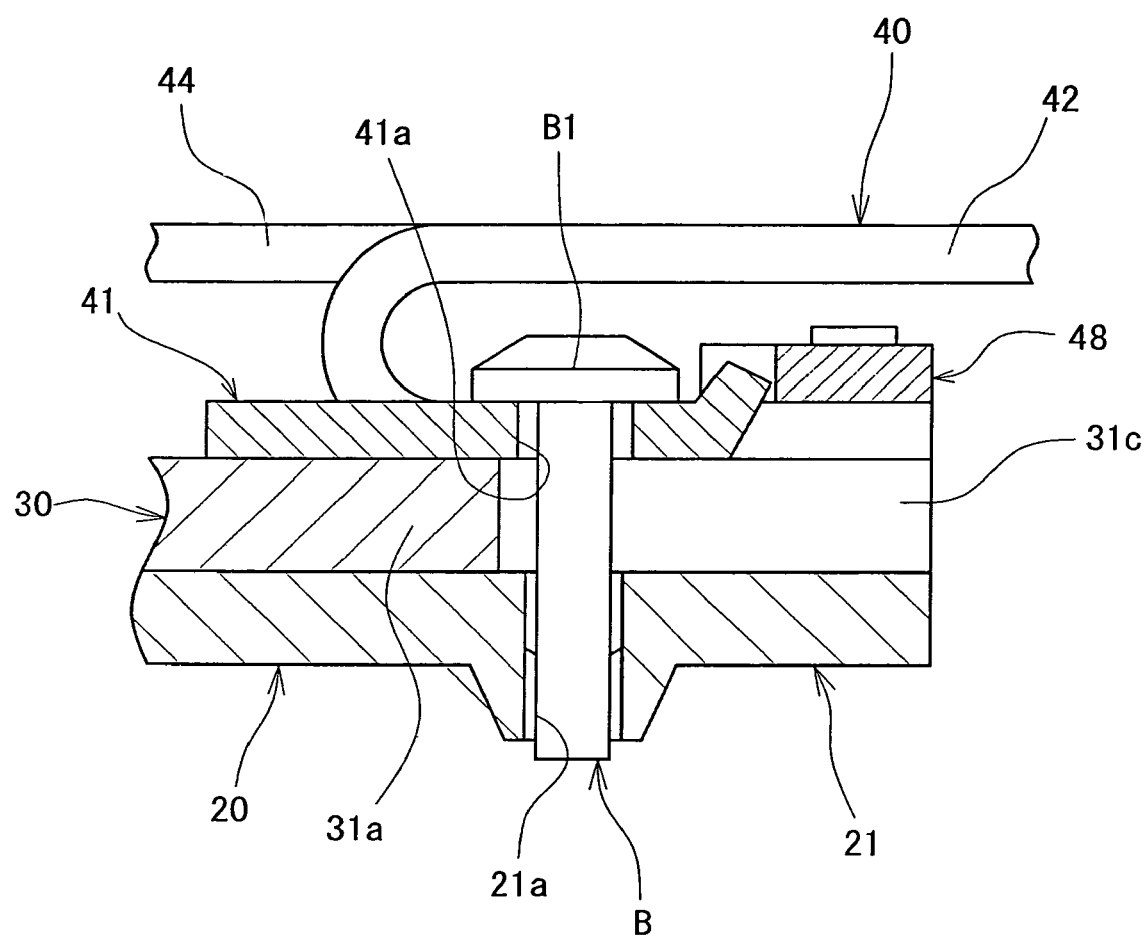
FIG. 3 is a sectional view taken along the line III-III in FIG. 1.

Next, the preferred embodiments of the invention will be described with reference to the accompanying drawings. FIG. 1 is a perspective view showing a constitution of an essential part of an energy absorbing steering apparatus according to one embodiment of the invention. FIG. 2 is an exploded perspective view of this energy absorbing steering apparatus. FIG. 3 is a sectional view taken along the line III-III in FIG. 1.

An energy absorbing steering apparatus S shown in the figures is a device for steering steerable vehicle wheels of a vehicle such as a motor vehicle. The apparatus S includes: a steering column C; and a steering wheel and a steering gear box (neither of which is shown) which are mounted to the steering column C. The steering wheel and the steering gear box are mounted to the opposite ends of the steering column C as an elongate member. In FIG. 1, the steering wheel is mounted to the front-side end of the steering column C as seen in the figure, while the steering gear box is coupled to the rear-side end of the steering column C as seen in the figure.

Hereinafter, the side of the end (front-side end as seen in the figure) mounted with the steering wheel will be referred to as the steering wheel side with respect to an axial direction of the steering column C, and the side of the end (rear-side end as seen in the figure) mounted with the gear box will be referred to as the gear box side.

Referring to the figure, the steering column C includes: a disengageable bracket 20 fixed to the steering column C; a stationary bracket 30 disposed upwardly of the disengageable bracket 20; and an energy absorbing member 40 disposed upwardly of the stationary bracket.

The disengageable bracket 20 is a member having a U-shaped cross section, including an upper side portion 21 abutting on an upper side of the steering column C, and a pair of lateral side portions 22 extending downward from the opposite ends of the upper side portion 21 along lateral sides of the steering column C. The disengageable bracket 20 is integrally fixed to the steering column C as retaining an outside surface of the steering column C by way of the upper side portion 21 and lateral side portions 22 thereof. The upper side portion 21 is formed with an internal thread 21a vertically extending therethrough. As will be described hereinlater, the internal thread 21a is threadedly engaged with a fixing bolt B which provides for the clamping of the stationary bracket 30 and the energy absorbing member 40.

The stationary bracket 30 disposed upwardly of the disengageable bracket 20 includes: a bracket body 31 having a U-shaped cross section and including an upper plate 31a abutting on the upper side portion 21 of the disengageable bracket 20 and side plates 31b abutting on the lateral side portions 22; and a pair of flanges 32 extending from the side plates 31b in laterally opposite directions. The upper plate 31a is formed with a slit 31c at a substantially central place with respect to the widthwise direction thereof, the slit opening towards the gear box side. The slit 31c is formed in an aligned relation with the internal thread 21a of the disengageable bracket 20 and is penetrated by the above fixing bolt B. The stationary bracket 30 has its flanges 32 integrally fixed to an unillustrated frame of a vehicle body whereby the stationary bracket is so fixed as not to move relative to the vehicle body.

The energy absorbing member 40 is formed by press working a steel sheet or the like and is disposed upwardly of the stationary bracket 30. The energy absorbing member 40 includes: a pair of steering-side inner fixed segments 42, 43 having their ends interconnected by means of a connection portion 41; a pair of vehicle-side fixed segments 44, 45 extending toward the steering wheel side and connected with respective outer sides of the steering-side inner fixed segments 42, 43 via first and second grooves M1, M2; and a pair of steering-side outer fixed segments 46, 47 connected with respective outer sides of the paired vehicle-side fixed segments 44, 45 via third and fourth grooves M3, M4. The grooves M1 to M4 are each recessed in a sheet thickness direction and interposed between a respective pair of fixed segments as extended in the axial direction of the steering column C.

As will be described hereinlater, the paired steering-side inner fixed segments 42, 43 and the paired steering-side outer fixed segments 46, 47 of the above-described fixed segments constitute a plurality of first fixed segments individually fixed to the steering-column side. On the other hand, the paired vehicle-side fixed segments 44, 45 constitute a plurality of second fixed segments individually fixed to the vehicle side, as will be described hereinlater.

The paired steering-side inner fixed segments 42, 43 are both disposed upwardly of the steering column C and include: body portions 42a, 43a individually connected with the vehicle-side fixed segments 44, 45 at the respective lateral side thereof; and fixed portions 42b, 43b formed by bending steering-wheel-side distal ends of the body portions 42a, 43a toward the gear box into a U-shape. The ends of these fixed portions 42b, 43b are interconnected by means of the connection portion 41. The connection portion 41 is formed with a through-hole 41a vertically extending therethrough. The through-hole 41a is formed in the aligned relation with the above-described slit 31c and internal thread 21a and is penetrated by the fixing bolt B. The connection portion 41 is contacted on its upper side by a head B1 of the fixing bolt B. The fixing bolt B threadedly engages the internal thread 21a thereby clamping the stationary bracket 30 and the connection portion 41 of the energy absorbing member 40.

The paired vehicle-side fixed segments 44, 45 include: body portions 44a, 45a individually connected with the individually adjoining fixed segments at the lateral sides thereof; and vehicle-body fixed portions 44b, 45b extending from the body portions 44a, 45a toward the steering wheel side. These vehicle-body fixed portions 44b, 45b have their distal ends bent downward to engage with a steering-wheel-side end face of the stationary bracket 30, whereby the vehicle-side fixed segments 44, 45 are fixed to the stationary bracket 30 in order not to be relatively moved toward the gear box.

The paired steering-side outer fixed segments 46, 47 include: body portions 46a, 47a individually connected with the vehicle-side fixed segments 44, 45 at the respective lateral side thereof; and fixed portions 46b, 47b formed by bending steering-wheel-side distal ends of the body portions 46a, 47a toward the gear box side into a U-shape.

These fixed portions 46b, 47b are interconnected by means of a lever 48 connected to the fixed portions as overlapped on the individual distal ends thereof. The distal ends of the fixed portions 46b, 47b are formed with through-holes 46c, 47c individually vertically extending therethrough, while the opposite ends of the lever 48 are also formed with through-holes 48a in aligned relation with the through-holes 46c, 47c of the fixed portions 46b, 47b. A pin 49 is inserted through the through-hole 46c of the fixed portion 46b and the corresponding through hole 48a of the lever 48, thereby interconnecting the distal end of the fixed portion 46b and the corresponding end of the lever 48.

On the other hand, a plunger 50a projecting from an actuator 50 fixed to a lateral side of the disengageable bracket 20 is inserted through the through-hole 47c of the fixed portion 47b and the corresponding through-hole 48a of the lever 48. The plunger interconnects the distal end of the fixed portion 47b and the corresponding end of the lever 48. The lever 48 has a side thereof abutting against an end face of the connection portion 41 formed at the energy absorbing member 40, as interconnecting the respective distal ends of the fixed segments 46, 47.

In the above-described manner, the lever 48 interconnects the paired steering-side outer fixed segments 46, 47 disposed in a manner to sandwich the paired steering-side inner fixed segments 42, 43 and the like disposed upwardly of the steering column C.

The actuator 50 is fixed to a mounting portion 22a disposed on the lateral side of the disengageable bracket 20 so as to be located laterally of the steering column C. The actuator operates to advance or retract the plunger 50a vertically based on an electrical signal inputted thereto. In a state where the electrical signal is not inputted, the plunger 50a of the actuator 50 is projected to interconnect the distal end of the fixed portion 47b and the corresponding end of the lever 48. The actuator 50 is adapted to retract the plunger 50a in response to the input of a predetermined signal thereby to release the above-described interconnection. That is, the actuator 50 constitutes connection release means for releasing the connection between the fixed portion 47b (steering-side outer fixed segment 47) and the lever 48. The actuator 50 is connected to a controller (not shown) or the like for grasping the running condition of the vehicle.

In a case where a decreased level of vehicle speed associated with a vehicle collision is not less than a predetermined value, the controller determines the collision to involve a comparatively high impact load. In this case, the controller does not output an actuating signal to the actuator 50. In a case where the decreased level of vehicle speed associated with the vehicle collision is less than the predetermined value, the controller determines the collision to involve a comparatively low impact load. In this case, the controller outputs a predetermined signal to the actuator 50 such as to retract the plunger 50a for releasing the above-described connection.

According to the embodiment, the connection release means for releasing the connection between the steering-side outer fixed segment 47 and the lever 48 is constituted by the actuator 50 operative to advance or retract the plunger 50a as a pin member. Hence, the connection release means may have a structure which can easily release the connection between the steering-side outer fixed segment 47 and the lever 48. In addition, the connection release may be easily controlled by means of the actuator.

Next, description is made on how the energy absorbing steering apparatus S and the energy absorbing member 40 operate when the impact load due to the secondary collision is applied to the steering wheel side of the energy absorbing steering apparatus S. In the event of a collision of a motor vehicle equipped with the energy absorbing steering apparatus S, the controller first determines based on the decreased level of vehicle speed associated with the vehicle collision whether the collision in question is one involving a comparatively high impact load (hereinafter, referred to as "high impact collision") or one involving a comparatively low impact load (hereinafter, referred to as "low impact collision").

The following description is made on a case where the controller determines the collision in question as the high impact collision.

If the controller determines the vehicle collision as the high impact collision, the controller does not output a signal for activating the plunger 48 of the energy absorbing apparatus S. Accordingly, the connection between the steering-side outer fixed segment 47 and the lever 48 is maintained as it is, so that the lever 48 retains the interconnection between the paired steering-side outer fixed segments 46, 47.

Subsequently when the driver secondarily collides against the steering wheel due to the vehicle collision, the driver pushes the steering wheel toward the front side of the vehicle body. Hence, the driver and the steering wheel are subjected to the impact load while the steering column C mounted with the steering wheel is pushed toward the gear box.

Figure 4:
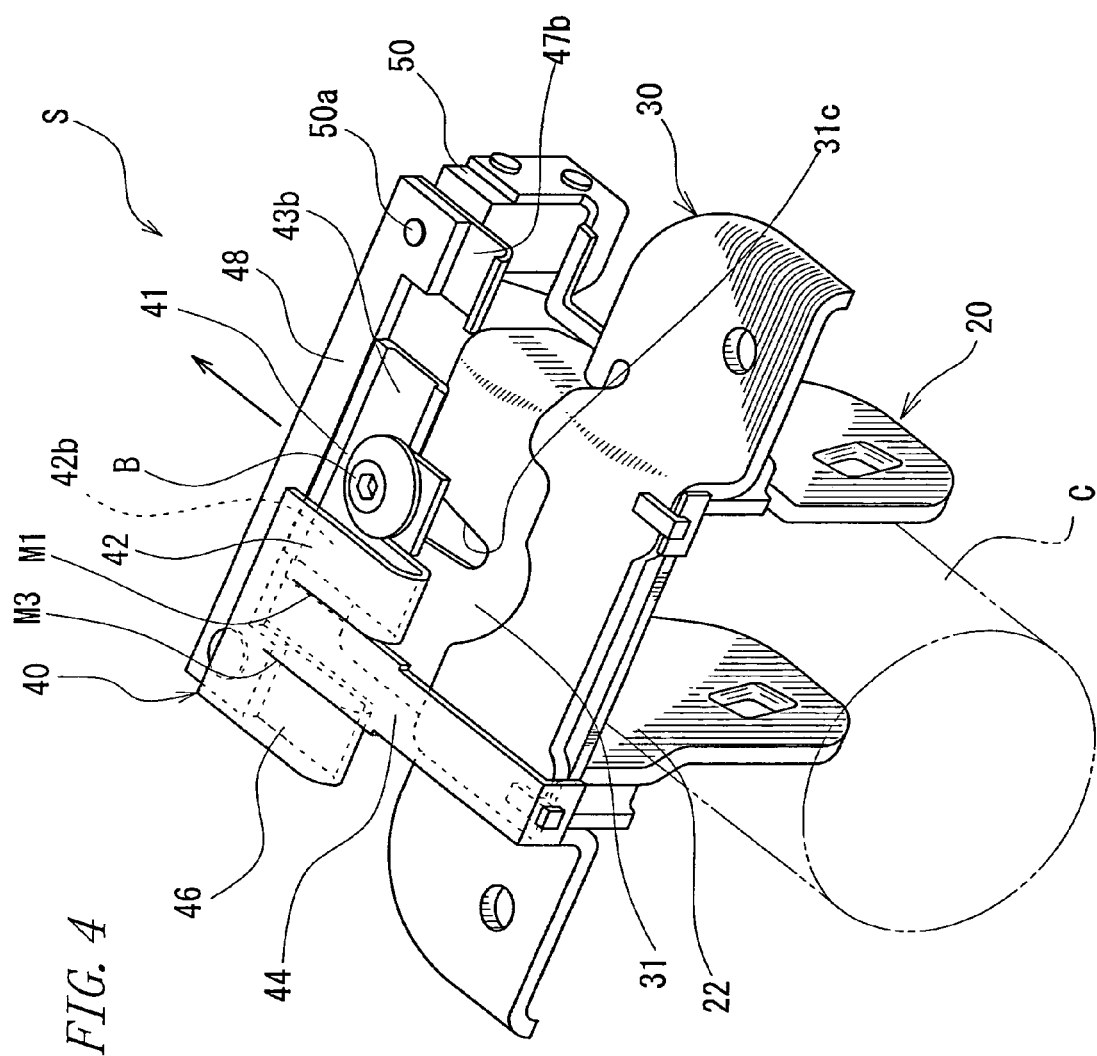
FIG. 4 is a perspective view of an essential part of the energy absorbing steering apparatus S for illustrating a state where a disengageable bracket is relatively moved toward a gear box during high impact collision.

FIG. 4 is a perspective view of the essential part of the energy absorbing steering apparatus S for illustrating a state where the disengageable bracket 20 is relatively moved toward the gear box. FIG. 4 omits a part of the energy absorbing member 40 in order to clarify the understanding of the invention.

The disengageable bracket 20 integrally fixed to the steering column C is held by the fixing bolt B so that the disengageable bracket 20 and the connection portion 41 of the energy absorbing member 40 clamp therebetween the stationary bracket 30 fixed to the vehicle body. When the impact load is exerted on the steering column C pushing the steering column C toward the gear box, as described above, the pushing action causes the disengageable bracket 20 to be relatively moved toward the gear box (in the direction indicated by the arrow in the figure). At this time, the connection portion 41 with the fixing bolt B inserted through the through-hole 41a thereof is also relatively moved toward the gear box along with the disengageable bracket 20 and the fixing bolt B. Hence, the fixed portions 42b, 43b of the steering-side inner fixed segments 42, 43 are also relatively moved toward the gear box.

On the other hand, the slit 31c of the stationary bracket 30 fixed to the vehicle body opens toward the gear box so as not to inhibit the fixing bolt B from being moved toward the gear box or disengaged therefrom (see FIG. 3).

At this time, the lever 48, abutting against the end faces of the connection portion 41 and fixed portions 42b, 43b on its side, retains the interconnection between the paired steering-side outer fixed segments 46, 47. Hence, the connection portion 41 relatively moved toward the gear box moves the lever 48 per se toward the gear box. Thus, the fixed portions 46b, 47b of the steering-side outer fixed segments 46, 47 interconnected by the lever 48 are relatively moved toward the gear box along with the connection portion 41 and fixed portions 42b, 43b as the lever 48 per se is moved toward the gear box, as shown in FIG. 4.

In the case where the disengageable bracket 20 is relatively moved toward the gear box, the individual fixed portions 42b, 43b, 46b, 47b are maintained in the state fixed to the disengageable bracket 20 (steering column C) in order that the fixed portions 42b, 43b, 46b, 47b may also be relatively moved toward the gear box.

On the other hand, the paired vehicle-side fixed segments 44, 45 are fixed to the stationary bracket 30 or the vehicle body so as to be inhibited from being brought into the above-described relative movement toward the gear box.

Therefore, the vehicle-side fixed segments 44, 45 of the energy absorbing member 40 remain on the vehicle body side, whereas the fixed portions 42b, 43b of the steering-side inner fixed segments 42, 43 and the fixed portions 46b, 47b of the steering-side outer fixed segments 46, 47, which belong to the energy absorbing member 40 fixed to the disengageable bracket 20, are relatively moved toward the gear box. Searing stress is applied between the vehicle-side fixed segment 44 and the steering-side fixed segments 42, 46 and between the vehicle-side fixed segment 45 and the steering-side fixed segments 43, 47 (see FIG. 1).

Thus, the individual fixed segments are torn apart along the individual grooves M1 to M4 by the shearing stress. Specifically, the energy absorbing steering apparatus according to the embodiment offers the following effect. When the secondary collision occurs to cause the steering column C to be relatively moved toward the gear box and disengaged from the vehicle body, the energy absorbing member 40 is torn apart while resistance occurring in conjunction with tearing apart the energy absorbing member is utilized for reducing the impact load exerted on the driver via the steering wheel.

The actuator 50 is fixed to the mounting portion 22a disposed on the lateral side of the disengageable bracket 20. Hence, the actuator is relatively moved together with the steering column C and disengageable bracket 20 and disengaged from the vehicle body.

The above lever 48 constitutes a connecting member which interconnects the steering-side outer fixed segments 46, 47 as the first fixed segments sandwiching the paired steering-side inner fixed segments 42, 43 as a part of the plural first fixed segments and which brings the fixed portions 46b, 47b of the steering-side outer fixed segments 46, 47 into relative movement as interconnecting these segments when the steering column C is relatively moved.

Next, description is made on the case where the controller determines the vehicle collision as the low impact collision.

Figure 5:
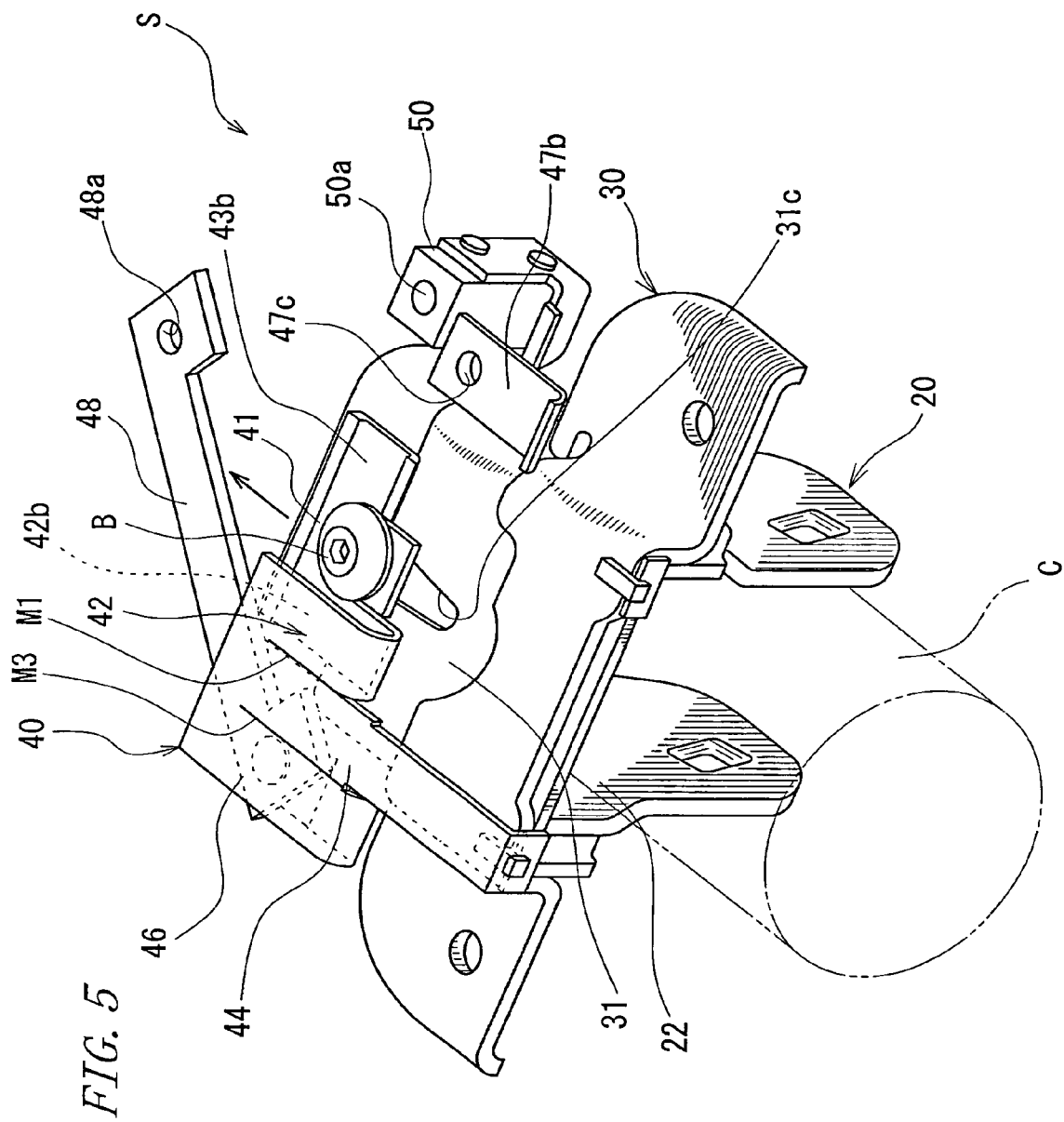
FIG. 5 is a perspective view of the essential part of the energy absorbing steering apparatus S for illustrating a state where the disengageable bracket is relatively moved toward the gear box during low impact collision.

FIG. 5 is a perspective view of the essential part of the energy absorbing steering apparatus S for illustrating a state where the disengageable bracket 20 is relatively moved toward the gear box during the low impact collision.

When determining the vehicle collision as the low impact collision, the controller outputs a signal for retracting the plunger 50a of the actuator 50. Therefore, the lever 48 is released from the connection with the steering-side outer fixed segment 47 so that the lever 48 releases the connection between the paired steering-side outer fixed segments 46, 47.

Subsequently when the driver secondarily collides against the steering wheel due to the vehicle collision, the driver pushes the steering wheel toward the front side of the vehicle body. Hence, the driver and the steering wheel are subjected to the impact load while the steering column C mounted with the steering wheel is pushed toward the gear box.

When the steering column is subjected to the impact load so as to be pushed toward the gear box, the steering column will bring the disengageable bracket 20 into relative movement toward the gear box (the direction indicated by the arrow in the figure). At this time, the connection portion 41 having the fixing bolt B inserted through the through-hole 41a thereof and the fixed portions 42b, 43b are also relatively moved toward the gear box along with the disengageable bracket 20 and the fixing bolt B.

At this time, the steering-side outer fixed segment 47 and the corresponding end of the lever 48 are released from the connection and the paired steering-side outer fixed segments 46, 47 are released from the connection. As shown in FIG. 5, therefore, the lever 48 is pivoted about the pin 49 as pushed by the relatively moved connection portion 41. Thus, the lever 48 is released from the abutment against the connection portion 41, thereby preventing the fixed portions 46b, 47b of the paired steering-side outer fixed segments 46, 47 from being relatively moved toward the gear box.

Accordingly, the shearing stress is not applied to places between the vehicle-side fixed segment 44 and the steering-side outer fixed segment 46 and between the vehicle-side fixed segment 45 and the steering-side outer fixed segment 47. Hence, the segments are not torn apart along the grooves M3, M4 formed between these fixed segments (see FIG. 1).

Specifically, the actuator 50 as the connection release means prevents the lever 48 from bringing the fixed portions 46b, 47b into the relative movement toward the gear box by releasing the connection between the lever 48 and the steering-side outer fixed segment 47, thereby inhibiting the paired steering-side outer fixed segments 46, 47 from being torn apart. Thus, the actuator 50 and the lever 48 jointly constitute relieving means which releases the lever 48 from the connection with the steering-side outer fixed segment 47, thereby relieving the lever 48 from tearing apart the paired steering-side outer fixed segments 46, 47.

In contrast to the case of high impact collision, the energy absorbing member is torn apart only along the grooves M1, M2 (see FIG. 1) defined between the vehicle-side fixed segment 44 and the steering-side inner fixed segment 42 and between the vehicle-side fixed segment 45 and the steering-side inner fixed segment 43 in the case of low impact collision. Therefore, the energy absorbing member is decreased in the cross section at which the segments are torn apart so that the impact load that can be reduced by the apparatus may be reduced. As a result, the energy absorbing steering apparatus S can vary the load to be reduced according to the impact load at collision.

According to the energy absorbing steering apparatus S of the embodiment having the above-described constitution, the paired steering-side outer fixed segments 46, 47 sandwiching therebetween the paired steering-side inner fixed segments 42, 43 disposed upwardly of the steering column C are connected to each other. Therefore, the connections at which the steering-side outer fixed segments 46, 47 are connected to the lever 48 may be located laterally of at least the paired steering-side inner fixed segments 42, 43 disposed upwardly of the steering column C. This permits the actuator 50 constituting the relieving means to be located at place proximal to the lateral side of the steering column C. Hence, the actuator 50 and the like may be prevented from protruding upwardly. When mounted in the vehicle, the energy absorbing steering apparatus S is less liable to interfere with any other devices and can achieve an enhanced layout characteristic.

It is noted that the energy absorbing steering apparatus of the invention is not limited to the foregoing embodiments. While the energy absorbing member of the above-described embodiments includes the paired vehicle-side fixed segments 44, 45 and the steering-side fixed segments 42, 43, 46, 47 disposed on the respective lateral sides of these vehicle-side segments, the number of the fixed segments is not limited. The energy absorbing member may include a lager number of fixed segments.

According to the embodiments, the steering-side fixed segments 42, 43, 46, 47 constitute the plural first fixed segments which include the fixed segments releasably interconnected by means of the lever 48. However, an alternative constitution may be made, for example, wherein the vehicle-side fixed segments fixed to the vehicle body constitute the plural first fixed segments and are designed to vary the relievable load according to the impact load at collision when the steering, column is relatively moved.

The actuator 50 of the foregoing embodiments may be, for example, a solenoid type actuator or an actuator of gunpowder ignition type.

Figure 6:
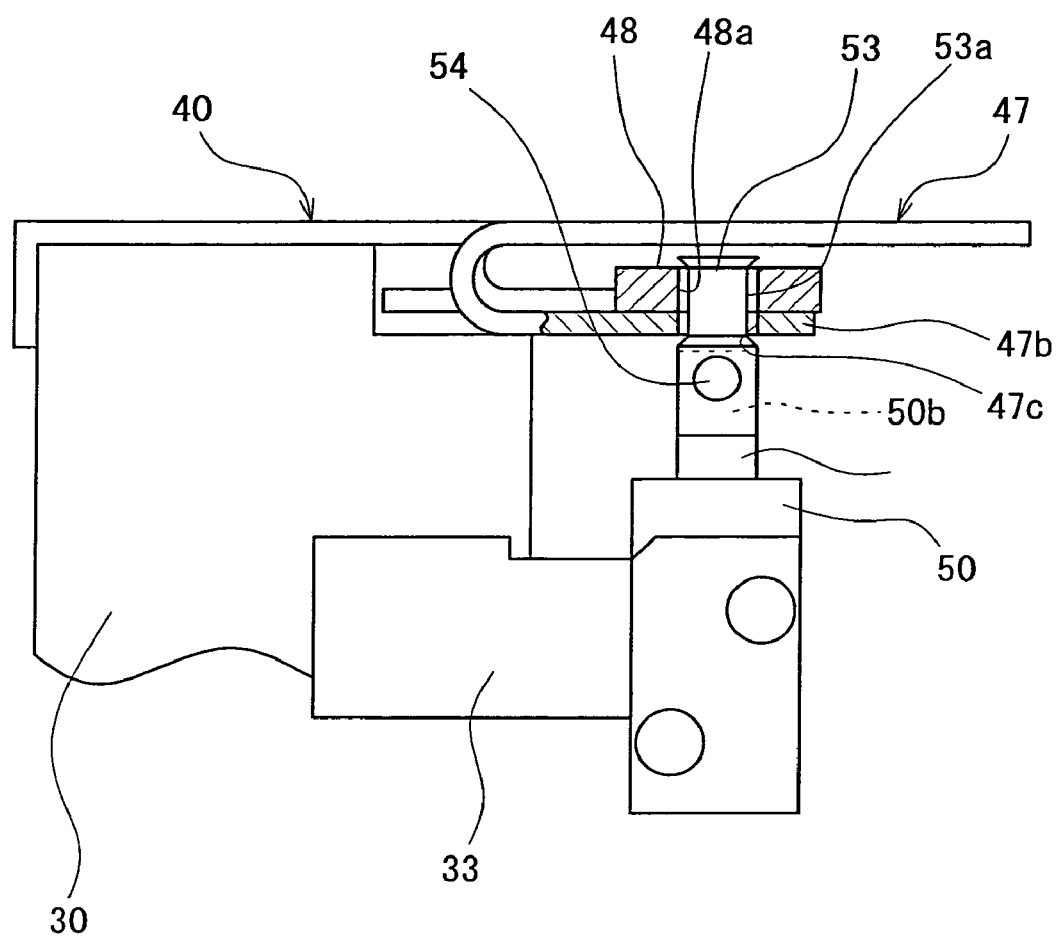
FIG. 6 is a side view of the essential part of the apparatus for illustrating an actuator fixing structure according to another embodiment.
Figure 7:
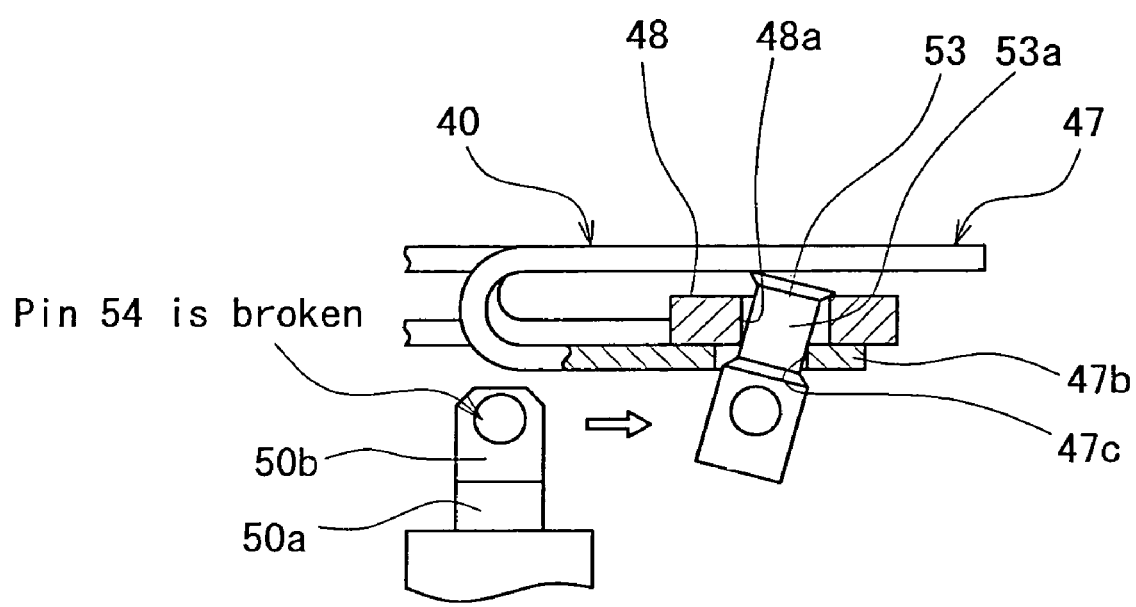
FIG. 7 is a diagram showing how the energy absorbing steering apparatus shown in FIG. 6 is activated.
Figure 8:
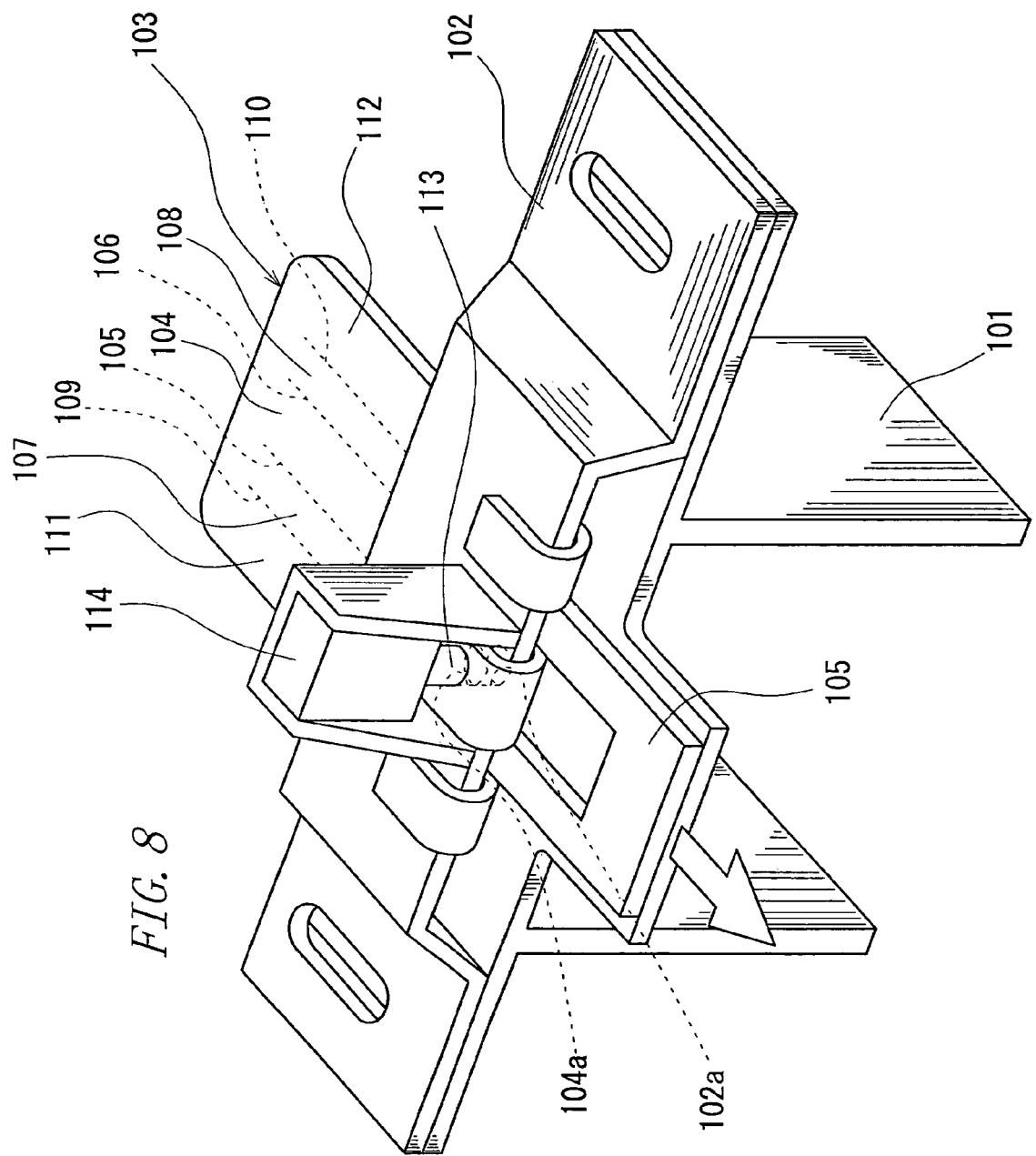
FIG. 8 is a perspective view of a conventional energy absorbing steering apparatus.

In the foregoing embodiments, the actuator 50 is mounted in a manner to be released together with the steering column C. As shown in FIG. 6, for example, an alternative constitution may be made wherein the actuator 50 is fixed to a mounting portion 33 disposed at the stationary bracket 30 and the plunger 50a is formed with a guide portion 50b at a distal end thereof, the guide portion 50b having a width across flat in the axial direction, and wherein a hook 53 as a pin member inserted through the through-holes 47c, 48a of the steering-side outer fixed segment 47 and the lever 48 is fixed to the guide portion 50b. In this case, the hook 53 is retained and fixed to the guide portion 50b of the plunger 50a by means of a pin 54 formed from a resin or the like. In the case of the high impact collision, the actuator 50 is not activated. Therefore, when the steering-side outer fixed segment 47 and the lever 48 are moved relative to the vehicle body, as shown in FIG. 7, the pin 54 fixing the hook 53 to place is broken to release the hook 53 from the actuator 50 so that the hook 53 is moved together with the steering-side outer fixed segment 47 and the lever 48. The hook 53 is formed with a guide portion 53a on its side for engagement with both the steering-side outer fixed segment 47 and the lever 48. Thus, the hook 53 maintains the connection between the steering-side outer fixed segment 47 and the lever 48 so that the individual fixed segments are torn apart along the individual grooves M1 to M4. On the other hand, the actuator 50 is activated in the case of the low impact collision. Hence, the hook. 53 is retracted from the through-holes 47c, 48a and releases the connection between the steering-side outer fixed segment 47 and the lever 48. Thus, the steering-side outer fixed segment 47 and the lever 48 can be releasably interconnected even if the actuator 50 is fixed to the stationary bracket 30. The above constitution provides an easy mounting of the actuator 50 because the actuator 50 requiring electrical connection may be fixed to the vehicle body.

What is claimed is:

1. An energy absorbing steering apparatus comprising:
an energy absorbing member which includes a plurality of first fixed segments comprising a metal sheet and including fixed portions fixed to one of a vehicle body and a steering column, and a plurality of second fixed segments comprising a metal sheet, including fixed portions fixed to the other one of the vehicle body and the steering column and connected with the plural first fixed segments via grooves recessed in a sheet thickness direction, and which absorbs an impact energy by permitting the individual fixed portions of the fixed segments to be moved relative to each other for tearing apart the individual fixed segments along the grooves in conjunction with relative movement between the steering column and the vehicle body occurring upon impact; and
relieving means which relieves some of the plural first fixed segments from being torn apart from the second fixed segments and which includes: a connecting member which interconnects a pair of first fixed segments of the plural first segments as connected with the respective fixed portions of the paired first fixed segments sandwiching therebetween at least one first fixed segment disposed upwardly of the steering column and which, during the relative movement between the steering column and the vehicle body, abuts against the fixed portion of the first fixed segment sandwiched between the paired first fixed segments thereby being brought into the relative movement together with the fixed portion in the abutment relation therewith as interconnecting the paired first fixed segments, and brings the fixed portions of the paired first fixed segments into the relative movement; and connection release means which is disposed laterally of the steering column and which releases the connecting member from the connection with the paired first fixed segments, thereby inhibiting the connecting member from bringing the fixed portions of the paired first fixed segments into the relative movement and preventing the paired first fixed segments from being torn apart from the second fixed segments.

2. An energy absorbing steering apparatus according to claim 1, wherein the connecting member and the paired first fixed segments are interconnected by pin members inserted through through-holes formed in these components, and
wherein the connection release means comprises an actuator retractably inserting the pin member into the through-holes.

* * * * *